United States Patent
Brunswig et al.

(10) Patent No.: US 9,547,505 B2
(45) Date of Patent: Jan. 17, 2017

(54) ADAPTIVE CONTEXTUAL GRAPHICAL REPRESENTATION OF DEVELOPMENT ENTITIES

(71) Applicants: Frank Brunswig, Heidelberg (DE); Frank Jentsch, Muehlhausen (DE); Bare Said, St. Leon (FR)

(72) Inventors: Frank Brunswig, Heidelberg (DE); Frank Jentsch, Muehlhausen (DE); Bare Said, St. Leon (FR)

(73) Assignee: SAP SE, Walldorf (DE)

( * ) Notice: Subject to any disclaimer, the term of this patent is extended or adjusted under 35 U.S.C. 154(b) by 233 days.

(21) Appl. No.: 13/909,457

(22) Filed: Jun. 4, 2013

(65) Prior Publication Data
US 2014/0359575 A1    Dec. 4, 2014

(51) Int. Cl.
G06F 9/44 (2006.01)
G06F 9/45 (2006.01)
G06F 9/48 (2006.01)
G06F 11/36 (2006.01)
G06F 9/445 (2006.01)

(52) U.S. Cl.
CPC ......... *G06F 9/4443* (2013.01); *G06F 9/4881* (2013.01); *G06F 11/3664* (2013.01); *G06F 8/34* (2013.01); *G06F 9/44521* (2013.01)

(58) Field of Classification Search
CPC ............... G06F 8/10; G06F 8/20; G06F 8/36; G06F 8/70; G06F 11/0709; G06F 8/34; G06F 8/71; G06F 8/30; G06F 8/33; G06F 8/38; G06F 9/4443; G06F 9/44521; G06F 9/541; G06F 9/4881; G06F 11/3664; G06Q 10/00; G06Q 10/06

See application file for complete search history.

(56) References Cited

U.S. PATENT DOCUMENTS 5,632,022 A * 5/1997 Warren ................. G06F 3/0483
715/255
5,956,479 A * 9/1999 McInerney ......... G06F 11/3664
714/38.13

(Continued)

OTHER PUBLICATIONS

Robert C. Seacord et al., AGORA: A Search Engine for Software Components, 1998, [Retrieved on Aug. 6, 2016]. Retrieved from the internet: <URL: http://ieeexplore.ieee.org/stamp/stamp.jsp?tp=&arnumber=735988> 9 Pages (62-70).*

(Continued)

*Primary Examiner* — Thuy Dao
*Assistant Examiner* — Anibal Rivera
(74) *Attorney, Agent, or Firm* — Mintz Levin Cohn Ferris Glovsky and Popeo, P.C.

(57) ABSTRACT

In some example implementations, there is provided a method. The method may include receiving, at an interface, a selection of one of a plurality of elements of a tool bar, the plurality of elements including an application structure element and a where-used element; obtaining, in response to the selected element, at least one view providing a graphical representation of context information for a component of a system; and providing to a user interface the at least one view as a stream to allow presentation at the user interface. Related systems, methods, and articles of manufacture are also provided.

14 Claims, 4 Drawing Sheets

(56) References Cited

U.S. PATENT DOCUMENTS

| | | | | |
|---|---|---|---|---|
| 6,232,972 | B1* | 5/2001 | Arcuri | G06F 3/0482 715/815 |
| 6,490,719 | B1* | 12/2002 | Thomas | G06F 9/44521 717/107 |
| 6,792,595 | B1* | 9/2004 | Storistenau | G06F 8/33 345/650 |
| 7,188,158 | B1* | 3/2007 | Stanton | G06F 9/541 709/220 |
| 7,523,440 | B2* | 4/2009 | Torgerson | G06F 8/38 715/781 |
| 9,021,425 | B2* | 4/2015 | Aly | G06F 8/34 717/100 |
| 2002/0097253 | A1* | 7/2002 | Charisius | G06F 8/20 715/700 |
| 2003/0083760 | A1* | 5/2003 | Keeley | G05B 19/0426 700/86 |
| 2004/0001092 | A1* | 1/2004 | Rothwein | G06F 8/38 715/763 |
| 2004/0036719 | A1* | 2/2004 | Van Treeck | G06F 9/4443 715/763 |
| 2006/0218521 | A1* | 9/2006 | Hagstrom | G06F 8/20 717/101 |
| 2006/0277089 | A1* | 12/2006 | Hubbard | G06Q 10/06 705/7.13 |
| 2006/0277479 | A1* | 12/2006 | Britt | G06F 9/4443 715/760 |
| 2007/0011620 | A1* | 1/2007 | Mendel | G06F 8/38 715/762 |
| 2007/0233681 | A1* | 10/2007 | Ronen | G06F 8/71 |
| 2007/0234290 | A1* | 10/2007 | Ronen | G06F 8/36 717/120 |
| 2007/0234291 | A1* | 10/2007 | Ronen | G06F 8/36 717/120 |
| 2007/0239470 | A1* | 10/2007 | Ronen | G06Q 10/10 715/733 |
| 2007/0250405 | A1* | 10/2007 | Ronen | G06F 8/36 705/26.1 |
| 2008/0127052 | A1* | 5/2008 | Rostoker | G06Q 30/02 717/105 |
| 2008/0244418 | A1* | 10/2008 | Manolescu | G06Q 10/00 715/753 |
| 2009/0293043 | A1* | 11/2009 | Begel | G06F 8/71 717/122 |
| 2011/0246961 | A1* | 10/2011 | Tripathi | G06F 8/34 717/105 |
| 2012/0110087 | A1* | 5/2012 | Culver | G06F 17/5004 709/205 |
| 2012/0254710 | A1* | 10/2012 | Flanagan | G06Q 10/06395 715/202 |
| 2012/0311522 | A1* | 12/2012 | Perisic | G06F 8/71 717/102 |
| 2013/0036407 | A1* | 2/2013 | Zheng | G06F 11/0709 717/135 |
| 2014/0208325 | A1* | 7/2014 | Chen | G06F 9/4881 718/102 |

OTHER PUBLICATIONS

Jack Greenfield et al., Software Factories Assembling Aplications with Patterns, Models Frameworks and Tools, 2003 ACM, [Retrieved on Aug. 6, 2016]. Retrieved from the internet: <URL: http://delivery.acm.org/10.1145/950000/949348/p16-greenfield. pdf?> 12 Pages (16-27).*

"Domain-specific language." Wikipedia, Last edited on May 5, 2015; Last accessed on May 11, 2015. <http://en.wikipedia.org/wiki/Domain-specific_language>.

"Model-driven software development." Wikipedia, Last edited on Jan. 16, 2015; Last accessed on May 11, 2015. <http://en.wikipedia.org/wiki/Model-driven_software_development>.

"MIME." Wikipedia, Last edited on Mar. 19, 2015; Last accessed on May 11, 2015. <http://en.wikipedia.org/wiki/MIME>.

* cited by examiner

ADAPTIVE CONTEXTUAL GRAPHICAL REPRESENTATION OF DEVELOPMENT ENTITIES

TECHNICAL FIELD

This disclosure relates generally to data processing and, in particular, to cloud computing.

BACKGROUND

Code development is extremely complex. It is thus not surprising that some software-based systems including thousands of components and millions of lines of code. As a consequence, numerous tools may be used to assists developers of a system including code. These tools may include debuggers, data/fact sheets, performance analyzers, and the like. However, the array of tools used by developers and their corresponding different interfaces only exacerbates the complexity of code development process.

SUMMARY

In some example implementations, there is provided a method. The method may include receiving, at an interface, a selection of one of a plurality of elements of a tool bar, the plurality of elements including an application structure element and a where-used element; obtaining, in response to the selected element, at least one view providing a graphical representation of context information for a component of a system; and providing to a user interface the at least one view as a stream to allow presentation at the user interface.

In some variations, one or more of the following features can optionally be included in any feasible combination. The plurality of elements may further include a technical package element and a responsible party element. The application structure element may represent a first view request for a relationship of the component to other components of the system, wherein the where-used element represents a second view request for where-used information for the component. The interface may represent a runtime service. The view may be generated to enable presentation within the selected element.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

A business system, such as an enterprise resource planning system, may include a plurality of development entities, such as components, and, in particular, may include dozens if not hundreds of development entities. The subject matter disclosed herein may, in some implementations, relate to providing contextual information for a development entity to assist in the development process of the system including the development entity. For example, the contextual information may include information representative of how a specific development entity is related to other development entities, and these relationships may be presented graphically, although textual representations may be provided as well. The contextual information may, in some implementations, be used during development including the analysis, debugging, code inspections, code review, performance analysis, and the like, of a software-based system including development entities/components and the like.

To describe the environment of a given development entity, a graphical element, such as a context information toolbar (also referred to as a context information element or context information toolbar element) may be used. The context information toolbar may, for a given component/development entity of a system, provide one or more of the following: a relation of the given component/development entity within the structure of a system including an application; a relation of the given component/development entity within a technical package structure; a relation of the given component/development entity to other development entities derived from where-used-list; a relation of the given component/development entity to responsible developers and knowledge management experts, their teams and their development areas; a relation of the given component/development entity within a given type of domain-specific models, and/or any other context information that may assist a user or developer of the system including the given component/development entity. Moreover, these relationships may be provided as a graphical view, and these relationships may be provided for one or more of the components/development entities of a software-based system.

Figure 1:
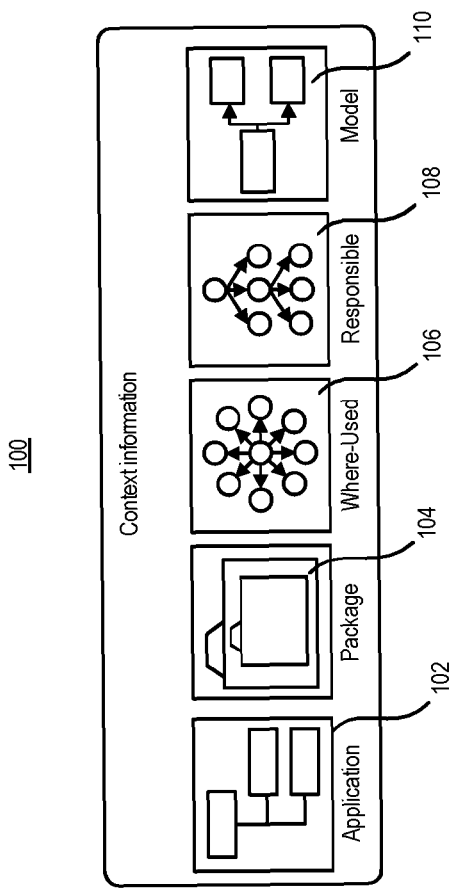
FIG. 1 illustrates an example a context information toolbar, according to some implementations of the current subject matter.

FIG. 1 depicts an example of context information toolbar element 100 used to present context information on development entities. When a development entity is selected at a user interface and one of the elements 102-110 is selected, context information for the development entity is obtained and used to form a view depicting the selected context for the development entity. For example, for a given development entity of a system being debugged at a debugger, selecting element 102 may provide a depiction of the relation of the given development entity to other development entities within the system's software application's structure.

Moreover, this relationship may be provided graphically as depicted at 102 to allow a user to understand the relationship of the given development to the structural relationships of the application. Selecting 104 may provide a relationship of the given development entity to other development entities within a technical package of, for example, development entities, such as an upgrade/update package. Selecting 106 may provide for the given development entity a where-used-list 106 to allow a developer to visualize graphically where, or all of, the locations the given development entity is used in a software-based system/application. Selecting 108 may provide context information related to responsible persons/entities for the given development entity, and selecting 110 may provide context information representative of a relation within a given type of domain-specific models 110. These views generated and presented when one or more of elements 102-110 are selected may allow a user select or browse development entities and quickly view context information for the selected/given development entity. Moreover, the views may be presented within the elements 102-110 themselves, although a separate view may be presented as well. In any case, the context information element 100 including elements 102-110 may provide context information presented as a view, which enables a user to understand how a development entity relates to other development entities of a system. Moreover, context information toolbar element 100 may provide an abstract, graphical view when each of 102-110 is selected to facilitate the consumption by the user of the context information depicted at the generated and presented views.

In some example implementations, context information element 100 may also include an interface and framework for runtime services and user interface integration. For example, selecting where-used 106 may result in a runtime service being called, which responds with an output stream providing a view with a graphical depiction of the where-used information for a given development entity. Moreover, the use of a runtime service and an output stream, such as a hypertext markup language stream may facilitate integration into user interfaces.

In some example implementations, the framework may include defined views for the one or more development entities of a system. For example, when a runtime service is called in response to a selection of one of elements 102-108, a configurator may access metadata required to provide a view and then generate (based on for example a model defining the view) the view for presentation at context information element 100.

Figure 2:
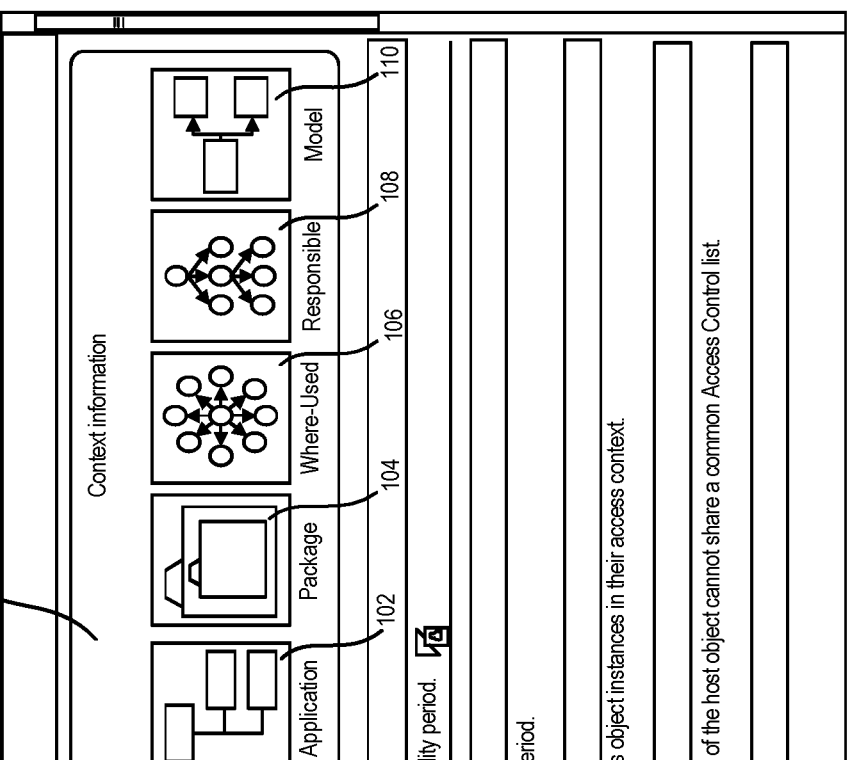
FIGS. 2-3 illustrate examples of context information toolbar integrated into user interfaces, according to some implementations of the current subject matter.

Context information toolbar element 100 may be embedded in a user interface of a system including an application, such as a debugger and/or the like. FIG. 2 depicts an example of a user interface 200 including an embedded context information toolbar element 100.

In the example of FIG. 2, user interface 200 presents information associated with a development entity, which in this example corresponds to a business object Access Control List 230. When one of the elements 102-110 is selected, a runtime service is called and a view is generated and provided for presentation at 200. For example, when responsible element 108 is selected, a runtime service may be called; and a configurator may then obtain metadata to generate a view, such as an organizational chart or a listing of the people/entities responsible for development, test, and other aspects of the business object Access Control List 230. The configurator may then provide the view to user interface 200, so the view can be presented in connection with user interface 200 and context information toolbar element 100. For example, the view can be presented as a separate view adjacent to context information element 100 or as a view within element 102. The view may graphically present identifiers/names for the object, such as the business object 230, structural information representative of whether the object is a so-called master or a dependent object, associated documentation, definitions, structural overview, usage, and object information.

Selection of other elements, such as 102-108, at context information toolbar element 100 may result in other views being provided to the user interface. In any case, the provided views may provide context information related to a development entity/component for a system under development, test, and/or the like.

In some example implementations, the context information toolbar element 100 may be configured to utilize a runtime service. For example, a runtime service may be called to provide an output stream for a given development entity and a requested element at context information toolbar element 100, such as one or more of elements 102-110. To illustrate, a developer at user interface 200 accessing a business object access control list 230 may select one of the elements 102-110. The selection may trigger a call to a runtime service, which responds with an output stream providing views with, for example, application information, package information, where-used information, responsibility information, and/or model information for a given development entity.

The runtime request for a view may be delegated to an actual implementation according to configuration settings. For example, an interface, such as IF_GRAPHICAL_REPRESENTATION, may define a method GET_OUTPUT_STREAM( )) as methods GET_OUTPUT_STREAM, which returns a value (OUTPUT_STREAM) type STRING, wherein GET_OUTPUT_STREAM( ) may return content of MIME type text/html (hypertext markup language). A consistent HTML approach/output stream approach may facilitate user interface integration of the graphical element 100 into various tools, such as browser-based debuggers, viewers, and the like.

Figure 3:
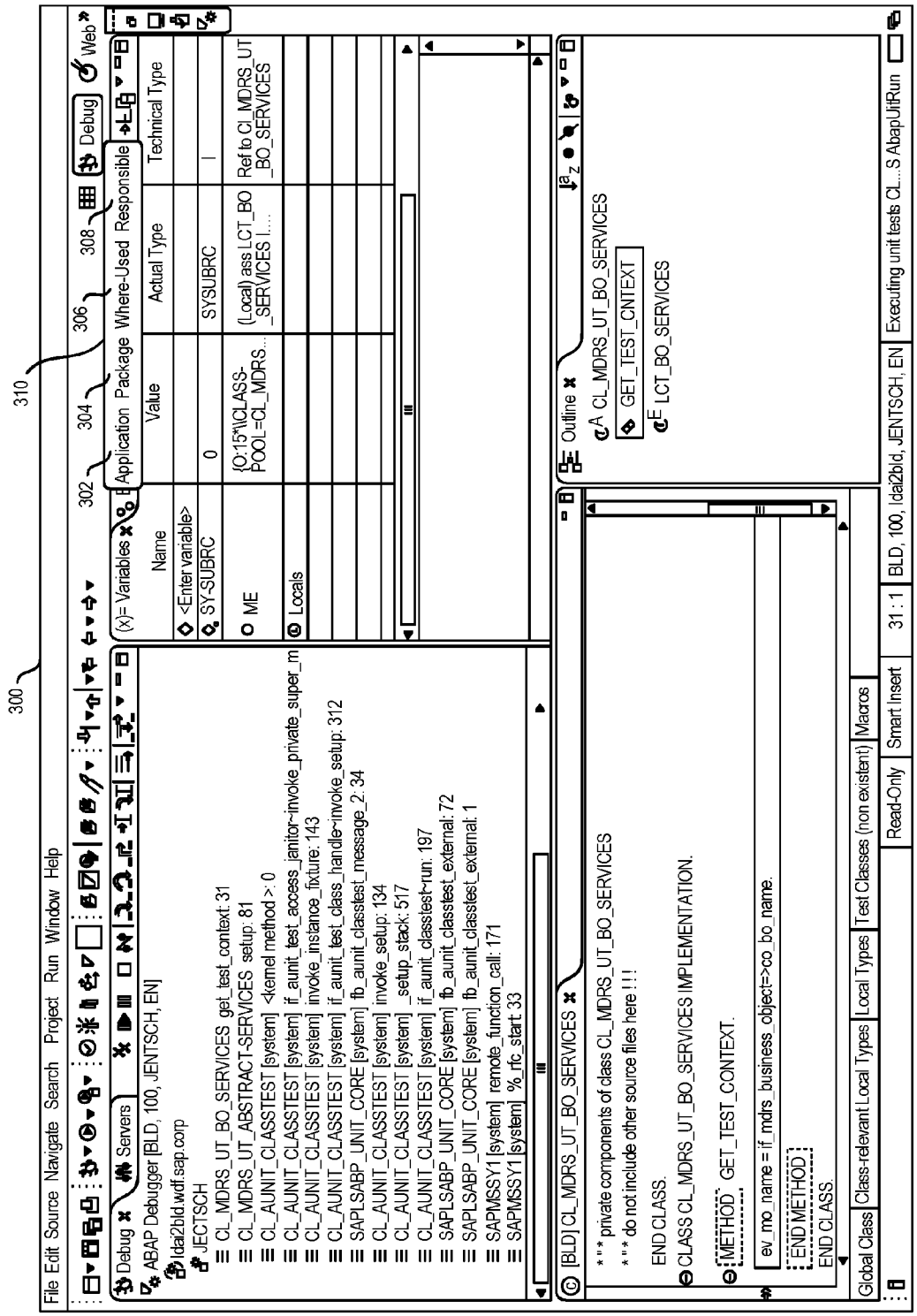

FIG. 3 depicts another example of a user interface 300 including an embedded context information element 310 integrated into user interface 300. In this example, user interface 300 represents a browser used in an development tool, such as a debugger. If the user seeks context information for the development entity being debugged at user interface 300, one of the elements, such as application 302, package 304, where-used 306, and/or responsible 308, is selected which causes a runtime service call to be made and a view to be generated and returned for presentation at 300.

In some example implementations, each of the development entities in a system may have a preconfigured view, which can be stored and provided when called via the runtime service. For example, selection of where-used 306 may trigger a runtime call to a service, which returns the preconfigured view for where-used information. The preconfigured view may then be returned to user interface 300 for presentation (for example, within view 320, as a separate view, and/or the like).

Figure 4:
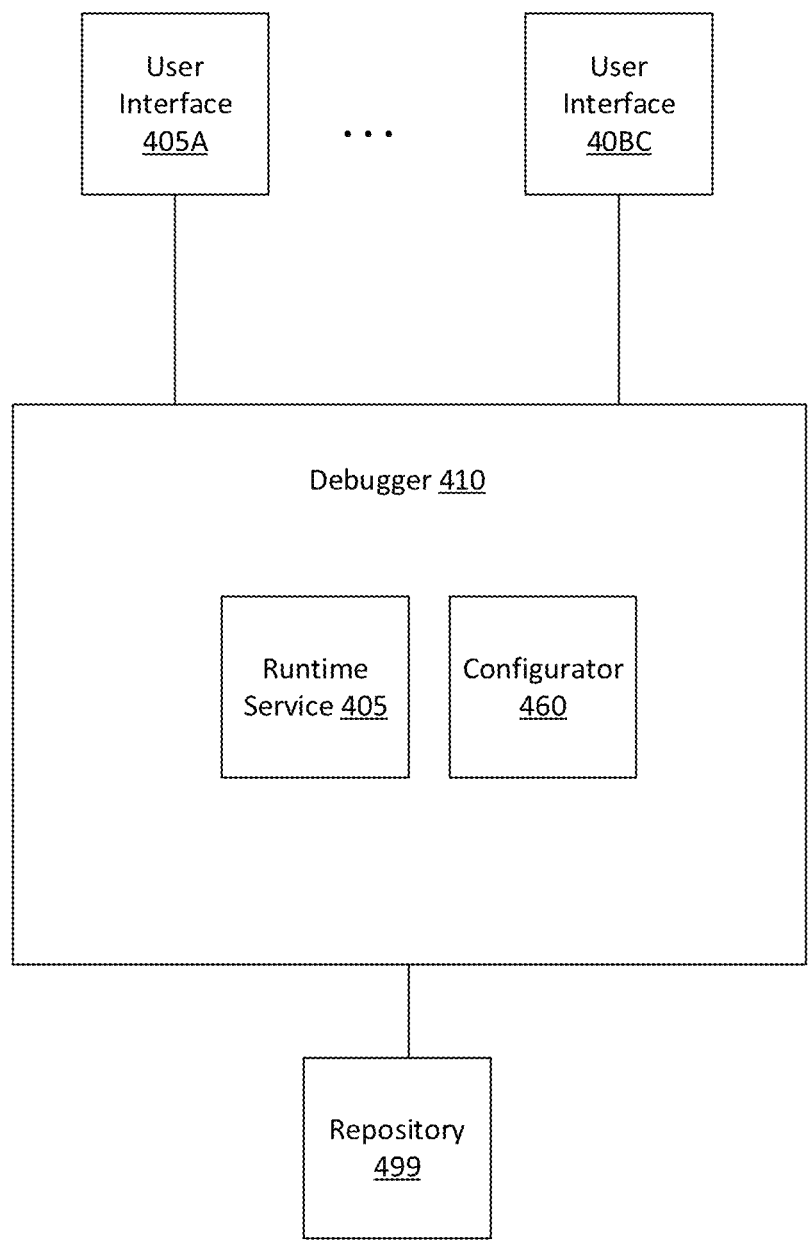
FIG. 4 depicts an example system for generating views including context information, according to some implementations of the current subject matter.

FIG. 4 depicts an example of a system 400 including one or more user interfaces, such as user interfaces 405A and C, a development application, such as a debugger 410, and the like. The debugger may include a runtime service interface 405, which can be called to provide an output stream providing the views for the context information element 100 and/or 300 including views for a relation of the given component/development entity within the structure of a system including an application; a relation of the given component/development entity within a technical package structure; a relation of the given component/development entity to other development entities derived from whereused-list; a relation of the given component/development entity to responsible developers and knowledge management experts, their teams and their development areas; a relation of the given component/development entity within a given type of domain-specific models, and/or any other context information that may assist a user or developer of the system including the given component/development entity. The configurator 460 may access metadata at repository 499, and the metadata may include preconfigured views for one or more development entities being developed/analyzed by debugger 410, although metadata may include data which can be used to generate the views as well. The configurator 460 may also provide the view(s) to the user interface as a graphical view providing the above-noted context and relationship information.

The configurator 460 may allow enhancements of pre-delivered default configuration. In addition to already existing defaults, configurator may also provide integration of further views.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
  receiving, via a first user interface, a selection of one of a plurality of elements of a tool bar, the plurality of elements including an application structure element, a package element, and a where-used element, the application structure element comprising information related to a first relationship between a component of a system and an application, the package element comprising information related to a second relationship between the component and a technical package, and the where-used element comprising information related to a location where the component is currently used within the system;
  obtaining, in response to the selected element, at least one view providing a graphical depiction of context information for the component of the system, the context information graphically depicting:
    the first relationship between the component and the application when the application structure element is selected,
    the second relationship between the component and the technical package when the package element is selected, and
    the location where the component is currently used within the system when the where-used element is selected; and
  providing, to a second user interface, the at least one view as a stream including the graphical depiction of the context information, the stream being presented at the second user interface, wherein the application structure element, the package element, and the where-used element are three distinct elements of the first user interface, and wherein the application and the technical package are two distinct components.

2. The computer-implemented method of claim 1, wherein the plurality of elements further comprises a model element and a responsible party element, the model element comprising information related to a third relationship between the component and a domain-specific model, the responsible party element comprising information related to a fourth relationship between the component and a developer and/or a management expert.

3. The computer-implemented method of claim 1, wherein the interface represents a runtime service.

4. The computer-implemented method of claim 1 further comprising:
  generating the at least one view to enable presentation within the selected element.

5. The method of claim 1, wherein the first interface is included within or adjacent to the second user interface.

6. The method of claim 1, wherein the technical package comprises an update package and/or an upgrade package.

7. A non-transitory computer-readable medium including code which when executed by at least one processor provides operations comprising:
  receiving, via a first user interface, a selection of one of a plurality of elements of a tool bar, the plurality of elements including an application structure element, a package element, and a where-used element, the application structure element comprising information related to a first relationship between a component of a system and an application, the package element comprising information related to a second relationship between the component and a technical package, and the where-used element comprising information related to a location where the component is currently used within the system;
  obtaining, in response to the selected element, at least one view providing a graphical depiction of context information for the component of the system, the context information graphically depicting:
    the first relationship between the component and the application when the application structure element is selected,
    the second relationship between the component and the technical package when the package element is selected, and
    the location where the component is currently used within the system when the where-used element is selected; and
  providing, to a second user interface, the at least one view as a stream including the graphical depiction of the context information, the stream being presented at the second user interface, wherein the application structure element, the package element, and the where-used element are three distinct elements of the first user interface, and wherein the application and the technical package are two distinct components.

8. The non-transitory computer-readable medium of claim 7, wherein the plurality of elements further comprises a model element and a responsible party element, the model element comprising information related to a third relationship between the component and a domain-specific model, the responsible party element comprising information related to a fourth relationship between the component and a developer and/or a management expert.

9. The non-transitory computer-readable medium of claim 7, wherein the interface represents a runtime service.

10. The non-transitory computer-readable medium of claim 7 further comprising:
  generating the at least one view to enable presentation within the selected element.

11. A system comprising:
  at least one processor; and
  at least one memory including code which when executed by the at least one processor provides operations comprising:
    receiving, via a first user interface, a selection of one of a plurality of elements of a tool bar, the plurality of elements including an application structure element, a package element, and a where-used element, the application structure element comprising information related to a first relationship between a component of a system and an application, the package element comprising information related to a second relationship between the component and a technical package, and the where-used element comprising information related to a location where the component is currently used within the system;

obtaining, in response to the selected element, at least one view providing a graphical depiction of context information for the component of the system, the context information graphically depicting:

the first relationship between the component and the application when the application structure element is selected, the second relationship between the component and the technical package when the package element is selected, and the location where the component is currently used within the system when the where-used element is selected; and providing, to a second user interface, the at least one view as a stream including the graphical depiction of the context information, the stream being presented at the second user interface, wherein the application structure element, the package element, and the where-used element are three distinct elements of the first user interface, and wherein the application and the technical package are two distinct components.

12. The system of claim 11, wherein the plurality of elements further comprises a model element and a responsible party element, the model element comprising information related to a third relationship between the component and a domain-specific model, the responsible party element comprising information related to a fourth relationship between the component and a developer and/or a management expert.

13. The system of claim 11, wherein the interface represents a runtime service.

14. The system of claim 11 further comprising:
generating the at least one view to enable presentation within the selected element.

* * * * *